US011406924B2

(12) United States Patent
Krull

(10) Patent No.: US 11,406,924 B2
(45) Date of Patent: Aug. 9, 2022

(54) FILTER WITH PROTECTIVE/SUPPORTIVE FLOW FACE GRATING

(71) Applicant: Timothy L. Krull, Kearney, NE (US)

(72) Inventor: Timothy L. Krull, Kearney, NE (US)

(73) Assignee: Parker-Hannifin Corporation, Cleveland, OH (US)

( * ) Notice: Subject to any disclaimer, the term of this patent is extended or adjusted under 35 U.S.C. 154(b) by 580 days.

(21) Appl. No.: 16/429,995

(22) Filed: Jun. 3, 2019

(65) Prior Publication Data
US 2019/0381440 A1    Dec. 19, 2019

Related U.S. Application Data

(60) Provisional application No. 62/720,632, filed on Aug. 21, 2018, provisional application No. 62/685,504, filed on Jun. 15, 2018.

(51) Int. Cl.
    *B01D 46/00*    (2022.01)
    *B01D 29/11*    (2006.01)
    *B01D 46/62*    (2022.01)

(52) U.S. Cl.
    CPC ........ *B01D 46/0005* (2013.01); *B01D 29/111* (2013.01); *B01D 46/0002* (2013.01); *B01D 46/645* (2022.01); *B01D 2271/02* (2013.01); *B01D 2275/40* (2013.01)

(58) Field of Classification Search
    CPC ............ B01D 46/0002; B01D 46/0005; B01D 2271/02; B01D 2271/022; B01D 2275/40; B01D 29/111; B01D 46/0026; B01D 46/10
    See application file for complete search history.

(56) References Cited

U.S. PATENT DOCUMENTS

| 5,820,646 A | 10/1998 | Gillingham et al. |
| 5,895,574 A | 4/1999 | Friedmann et al. |
| 6,059,966 A * | 5/2000 | Brandhofer ............ B01D 25/02 210/232 |
| 6,190,432 B1 | 2/2001 | Gieseke et al. |
| 6,210,469 B1 | 4/2001 | Tokar |
| 6,235,195 B1 | 5/2001 | Tokar |
| 6,824,581 B1 | 11/2004 | Tate et al. |
| 7,282,075 B2 | 10/2007 | Sporre et al. |
| 7,323,029 B2 | 1/2008 | Engelland et al. |
| 7,338,544 B2 | 3/2008 | Sporre et al. |
| 7,351,270 B2 | 4/2008 | Engelland et al. |
| 7,625,419 B2 | 12/2009 | Nelson et al. |
| 7,967,898 B2 | 6/2011 | Sporre et al. |
| 8,016,903 B2 | 9/2011 | Nelson et al. |
| 8,034,145 B2 | 10/2011 | Boehrs et al. |

(Continued)

FOREIGN PATENT DOCUMENTS

| EP | 0082106 | 6/1983 |
| WO | WO 91/19898 | 12/1991 |

(Continued)

*Primary Examiner* — Robert Clemente
(74) *Attorney, Agent, or Firm* — Reinhart Boerner Van Deuren P.C.

(57) ABSTRACT

A filter assembly and related method are provided. The filter assembly includes one or more support grates for supporting a filter media of the filter assembly. The support grate and filter media are interposed between a pair of preformed end walls of a frame.

17 Claims, 5 Drawing Sheets

(56) References Cited

U.S. PATENT DOCUMENTS

| | | |
|---|---|---|
| 8,048,188 B2 | 11/2011 | Widerski et al. |
| 8,062,399 B2 | 11/2011 | Nelson et al. |
| 8,147,582 B2 | 4/2012 | Engelland et al. |
| 8,277,532 B2 | 10/2012 | Reichter et al. |
| 8,292,983 B2 | 10/2012 | Reichter et al. |
| 8,328,897 B2 | 12/2012 | Nelson et al. |
| 8,382,875 B2 | 2/2013 | Engelland et al. |
| 8,382,876 B2 | 2/2013 | Widerski et al. |
| 8,480,779 B2 | 7/2013 | Boehrs et al. |
| 8,491,684 B2 | 7/2013 | Raether et al. |
| 8,491,691 B2 | 7/2013 | Raether |
| 8,496,723 B2 | 7/2013 | Reichter et al. |
| 8,617,276 B2 | 12/2013 | Raether et al. |
| 8,636,820 B2 | 1/2014 | Reichter et al. |
| 8,685,130 B2 | 4/2014 | Nelson et al. |
| 8,709,119 B2 | 4/2014 | Reichter et al. |
| 8,741,017 B2 | 6/2014 | Nelson |
| 8,771,395 B2 | 7/2014 | Raether |
| 8,808,417 B2 | 8/2014 | Engelland et al. |
| 8,906,128 B2 | 12/2014 | Reichter et al. |
| 8,915,985 B2 | 12/2014 | Dewit et al. |
| 8,920,528 B2 | 12/2014 | Dewit et al. |
| 9,039,802 B2 | 5/2015 | Scott et al. |
| 9,120,047 B2 | 9/2015 | Boehrs et al. |
| 9,180,399 B2 | 11/2015 | Reichter et al. |
| 9,217,399 B2 | 12/2015 | Engelland et al. |
| 9,242,199 B2 | 1/2016 | Nelson et al. |
| 9,393,511 B2 | 7/2016 | Raether |
| 9,527,023 B2 | 12/2016 | Reichter et al. |
| 9,597,623 B2 | 3/2017 | Raether et al. |
| 9,751,036 B2 | 9/2017 | Raether et al. |
| 9,776,120 B2 | 10/2017 | Raether |
| 9,795,911 B2 | 10/2017 | Reichter et al. |
| 9,937,455 B2 | 4/2018 | Boehrs et al. |
| 9,943,797 B2 | 4/2018 | Nelson et al. |
| 9,956,516 B2 | 5/2018 | Nelson |
| 10,279,300 B2 | 5/2019 | Nelson |
| 2011/0173937 A1 | 7/2011 | Nelson |
| 2012/0124947 A1 | 5/2012 | Dewit et al. |
| 2015/0113926 A1 | 4/2015 | Dewit et al. |
| 2016/0136561 A1 | 5/2016 | Nelson et al. |
| 2016/0184756 A1 | 6/2016 | Engelland et al. |
| 2016/0184757 A1 | 6/2016 | Reichter et al. |
| 2017/0182443 A1 | 6/2017 | Reichter et al. |
| 2017/0348627 A1 | 12/2017 | Raether et al. |
| 2017/0361255 A1 | 12/2017 | Raether |
| 2018/0065069 A1 | 3/2018 | Dewit et al. |
| 2018/0099242 A1 | 4/2018 | Reichter et al. |
| 2018/0111079 A1 | 4/2018 | Tate et al. |
| 2018/0169555 A1* | 6/2018 | Von Seggern ....... B01D 46/526 |
| 2018/0207566 A1* | 7/2018 | Stanhope ............ B01D 46/523 |
| 2018/0326344 A1 | 11/2018 | Boehrs et al. |

FOREIGN PATENT DOCUMENTS

| | | |
|---|---|---|
| WO | WO 2013/139992 | 9/2013 |
| WO | WO 2017/031168 | 2/2017 |
| WO | WO 2017/160592 | 9/2017 |

* cited by examiner

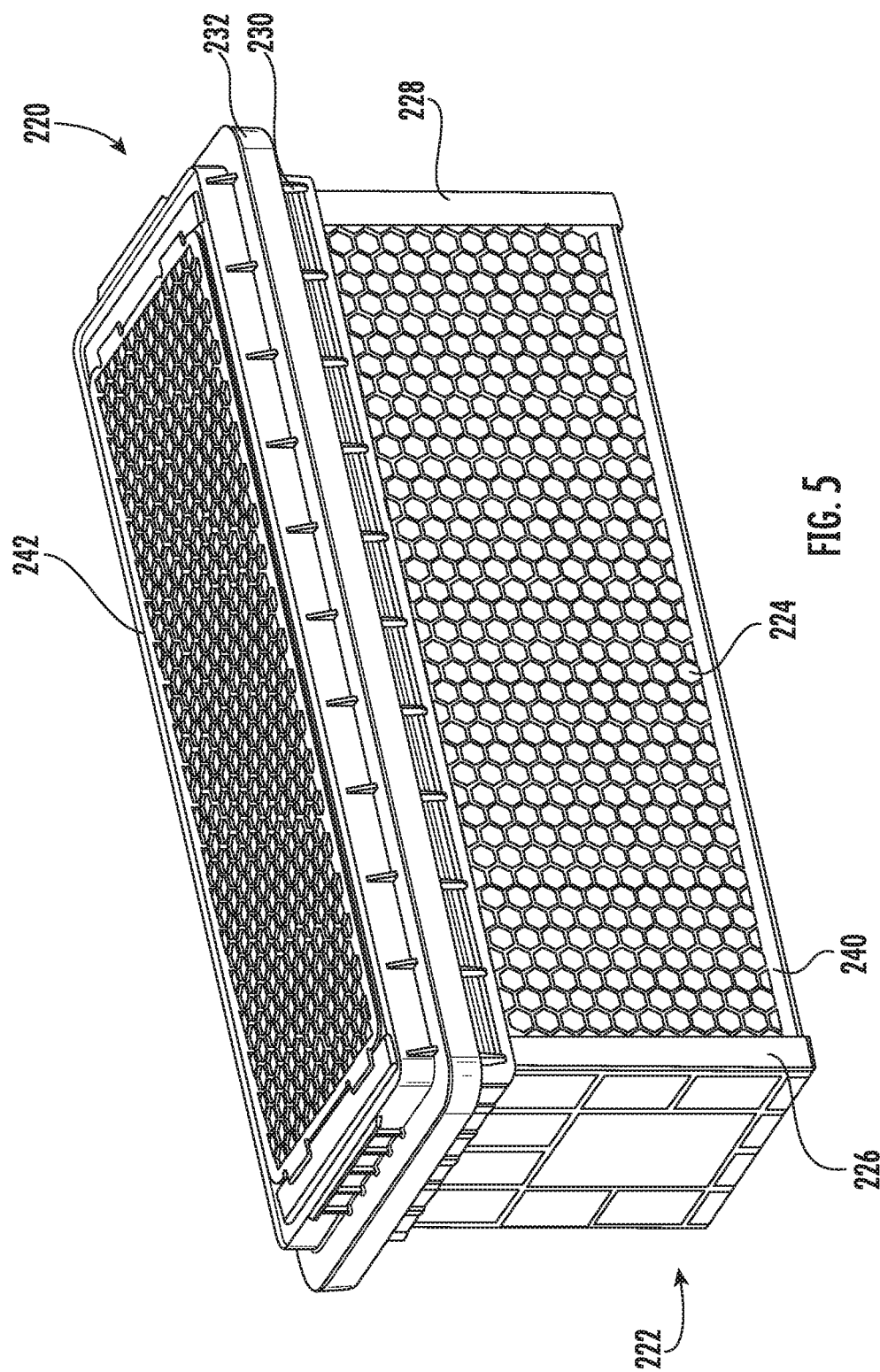

FILTER WITH PROTECTIVE/SUPPORTIVE FLOW FACE GRATING

CROSS-REFERENCE TO RELATED PATENT APPLICATIONS

This patent application claims the benefit of U.S. Provisional Patent Application No. 62/685,504, filed Jun. 15, 2018, and U.S. Provisional Patent Application No. 62/720,632, filed Aug. 21, 2018, the entire teachings and disclosure of which are incorporated herein by reference thereto.

FIELD OF THE INVENTION

The present invention is generally directed toward air filter elements and/or air assemblies, and more particularly directed toward engine air filter assemblies that may be employed in a housing body and a cover, and installations and use of such filter elements therein.

BACKGROUND OF THE INVENTION

A variety of air filters are known, for example, as shown in U.S. Pat. No. 6,824,581 titled "Pleated Filter Media with Embossed Spacers and Cross Flow"; U.S. Pat. No. 5,820,646 titled "Inline Filter Apparatus"; PCT Publication WO 91/19898 titled "Filter and Process for Manufacturing of Filter"; and U.S. Patent Application Publication No. 2018/0111079 titled "Air Filter With Outlet Receiver and Housing Assembly Incorporating Same"; the teachings and disclosures of which are incorporated by reference herein in their entireties. Distinctions over the state of the art are presented herein.

BRIEF SUMMARY OF THE INVENTION

In one aspect, the invention provides a filter assembly having enhanced structural support when it is subjected to differential pressure during use. An embodiment of such a filter assembly includes a frame defining a cavity and including opposing end walls, with a gasket outwardly circumscribing the frame. The filter assembly also includes a filter media disposed within the cavity of the frame, and having upstream and downstream flow faces and opposing side surfaces. The filter assembly also includes a U-shaped perforated grate including a body and opposing sides, located and extending between the opposing end walls and with the body adjacent one of the upstream and downstream flow faces of the media, with each side adjacent respective side surfaces of the filter media.

In certain embodiments according to this aspect, opposing edges of the U-shaped perforated grate are potted within adhesive carried by the opposing end walls.

In certain embodiments according to this aspect, a living hinge interconnects each side of the U-shaped perforated grate and the body. A flat grate may also be included which is adjacent the other one of the upstream and downstream flow faces. The flat grate is connected to the opposing end walls of the frame via a tab and slot configuration. The tab and slot configuration includes at least one tab arranged on each of opposing side edges of the flat grate and at least one slot arranged on each of the opposing end walls associated with the at least one tab.

In certain embodiments according to this aspect each of the opposing sides of the U-shaped perforated grate includes a solid, non-perforated section. The non-perforated section may for example be approximately 50% of the total area of the opposing side the non-perforated section is formed on.

In certain embodiments according to this aspect, the frame also includes a gasket support, with the gasket affixed to a flange of the gasket support. The flange may be non-parallel to the upstream and downstream flow faces. Alternatively, the flange may be parallel to the upstream and downstream flow faces.

In another aspect, the invention provides a filter assembly having enhanced filter media protection, particularly protection from handling damage. An embodiment of such a filter assembly includes a frame having preformed opposing end walls and defining a cavity, wherein a gasket is mounted on the frame. The filter assembly also includes filter media situated within the cavity, the filter media having opposed upstream and downstream flow faces and side surfaces extending between the upstream and downstream flow faces. The filter assembly also includes a U-shaped perforated grate arranged adjacent one of the upstream and downstream flow faces, and two of the side surfaces. The filter assembly also includes a flat perforated grate arranged adjacent the other one of the upstream and downstream flow faces.

In certain embodiments according to this aspect, the flat perforated grate is removably attached to the opposing end walls.

In certain embodiments, the U-shaped perforated grate is potted in place between the opposing end walls using a potting material. The filter media is also potted in place between the opposing end walls using the potting material. The U-shaped perforated grate includes a body and opposing sides, wherein each opposing side is connected to the body via a living hinge.

In yet another aspect, the invention provides a method of making a filter assembly that incorporates a supportive structure for filter media of the filter media pack during manufacturing. An embodiment of this method includes providing a filter media, providing a U-shaped perforated grate, affixing the U-shaped perforated grate to the filter media, preforming a pair of end walls via molding, situating a potting compound within a cavity of each opposing end wall, attaching each opposing end wall to opposing sides of the filter media such that the opposing sides and opposing side edges of the U-shaped grate are situated within the potting compound, and situating a gasket support with a gasket affixed thereto around the filter media, the U-shaped perforated grate, and the opposing end walls.

In certain embodiments according to this aspect, the method also includes attaching a flat perforated grate to the opposing end walls. In certain embodiments according to this aspect, the step of affixing the U-shaped perforated grate includes forming the U-shaped perforated grate as a flat component having a body and sides connected at opposing sides of the body via living hinges, and folding the sides along the living hinges to form a U-shape.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 5 is a perspective view of another exemplary embodiment of a filter element according to the teachings herein.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, embodiments of a filter assembly according to the teachings herein are illustrated. As will be explained in greater detail below, a filter assembly constructed according to the teachings herein exhibits enhanced structural support and protection of its associated filter media. The aforementioned structural support is due in part to the inclusion of one or more grates which support and protect the filter media.

Figure 1:
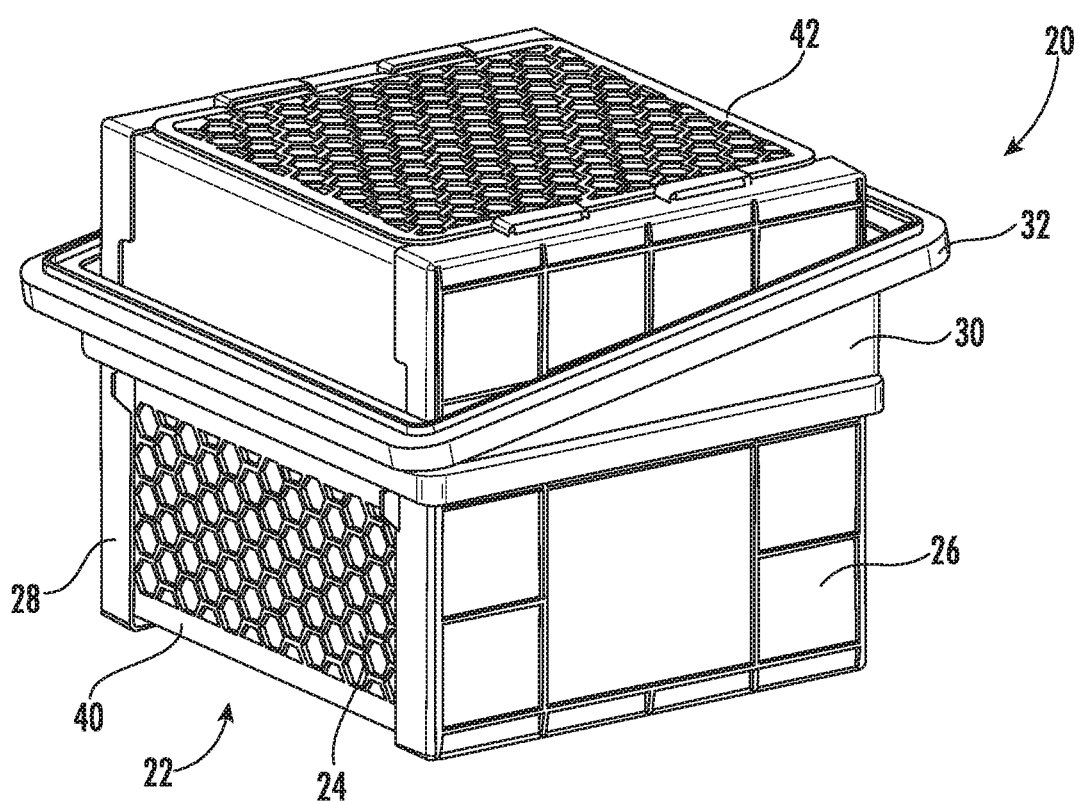
FIG. 1 is a perspective view of an exemplary embodiment of a filter element according to the teachings herein.

With particular reference to FIG. 1, the same illustrates an embodiment of a filter assembly 20 constructed in accordance with the teachings herein. Filter assembly 20 includes a frame 22. Frame 22 includes a pair of opposing end walls 26, 28 which define a cavity. A block or pack of filter media 24 is situated within this cavity between said end walls. Filter media 24 may be embodied as any type of media, e.g. fluted, pleated, etc., and as such, the invention is not limited to any particular type of media. However, it has been found that the particular configuration performs significantly well with so-called deep-pleated filter media.

Frame 22 may also include a gasket support 30. This gasket support 30 supports a gasket 32 which surrounds, i.e. circumscribes, the frame as shown. Gasket 32 may be formed from any material suitable for providing a gasket type seal. Gasket 32 is preformed into its desired shape, and then secured to a flange of gasket support 30. Gasket 32 may adopt any geometry necessary to provide an adequate seal with an opposing seal surface(s).

Gasket support 30 is a preformed component and may be formed of any material suitable to support gasket 32 and the associated forces exerted on gasket 32 during sealing. As is illustrated in FIG. 1, gasket support 30 is configured such that gasket 32 is non-parallel to upstream and downstream faces 60, 62 (see FIG. 2) of filter media 24. However, in other embodiments, gasket support 30 may be configured such that gasket 32 is positioned parallel to these faces 60, 62.

As introduced above, filter assembly 20 also includes one or more grates 40, 42, which provide structural support to the overall assembly and protect filter media 24 during both operation as well as initial manufacture. These grates includes a U-shaped perforated grate 40, and a flat perforated grate 42. Although both grates 40, 42 are shown, it is contemplated that only grate 40 may be employed and to achieve a majority of the advantages described herein. However, the inclusion of both grates 40, 42 provides additional protection and support.

Grate 40 possesses a U-shape such that it wraps around three sides filter media 24. One of these sides may be an upstream (i.e. an inlet) or a downstream (i.e. outlet) face of filter media 24. In the illustrated embodiment, grate 40 is positioned adjacent the downstream face of filter media 24. Grate 40, along with filter media 24 is potted in place between opposing end walls 26, 28.

Grate 42 possesses a flat shape and is removably secured to opposing end walls 26, 28. "Removably secured" as used herein means secured in such a way that it may be repeatedly removed and reinstalled without destroying or otherwise rendering inoperative any of the remaining structure of filter assembly 20. Grate 42 is positioned adjacent one of the upstream or downstream faces of filter media 24 which is opposite the face which grate 40 is adjacent to.

Figure 2:
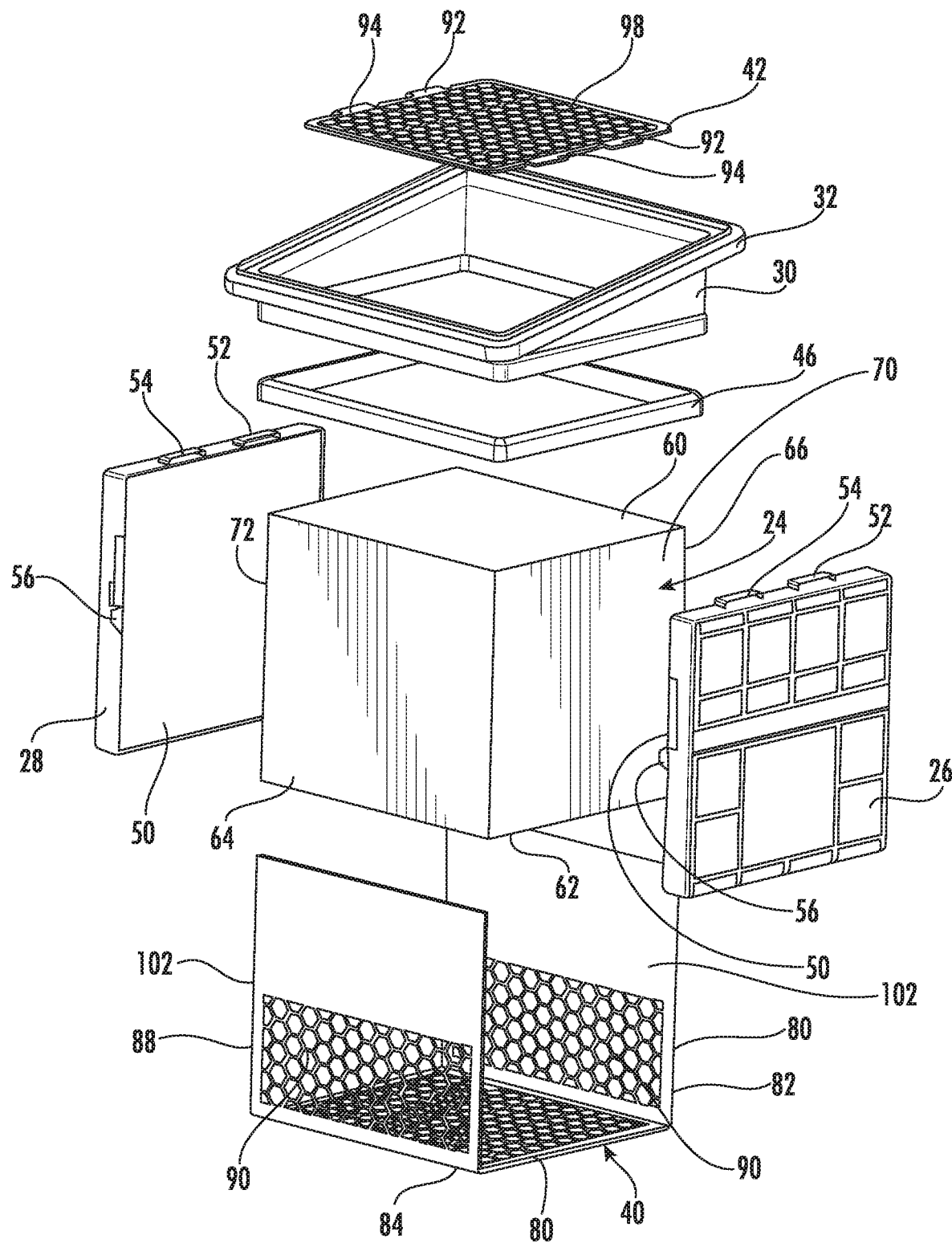
FIG. 2 is a perspective exploded view of the embodiment of FIG. 1.

Turning now to FIG. 2, each of grates 40, 42 include perforations 90, 98 respectively. These perforations generally resemble a honeycomb structure and allow for a sufficient air flow to and from the filter media face they are adjacent to. Although shown as a honeycomb structure, it is contemplated that these perforations 90, 98 may take the form of any number of openings of any shape. As may be seen in FIG. 2, U-shaped grate 40 includes a body portion 80 and opposing sides 82, 84 on either side of body portion 80.

Figure 3:
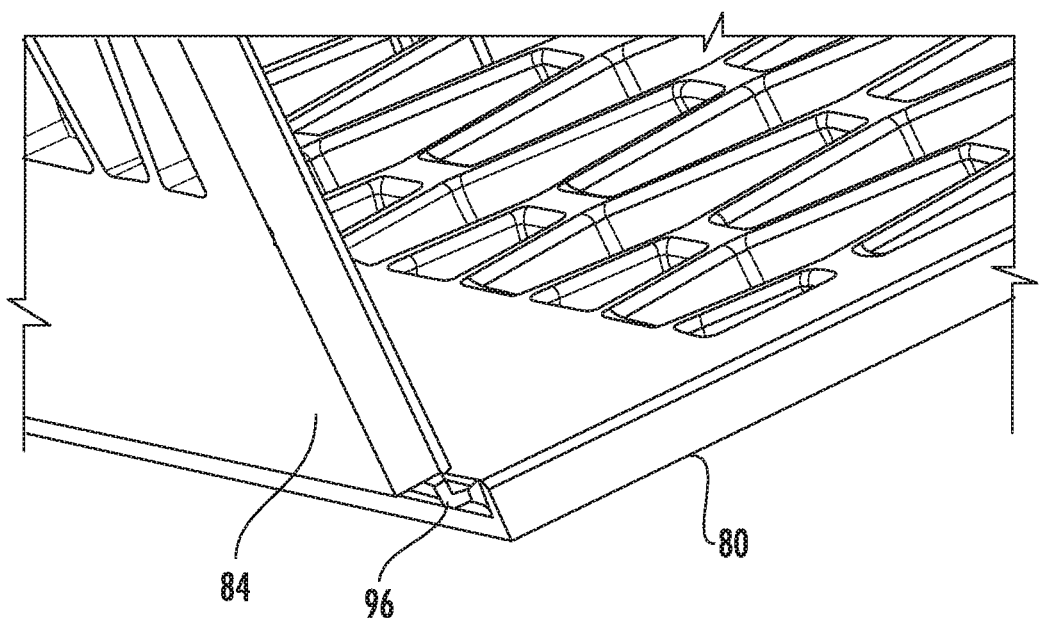
FIG. 3 is a partial perspective view of an outlet grate of the embodiment of FIG. 1.

Each side 82, 84 is separated from body portion 80 via a living hinge 96 as may be seen in FIG. 3 relative to side 84 and body portion 80. This living hinge 96 allows grate 40 to be initially formed as a flat component, and then bent to achieve its U-shape. Each opposing side 82, 84 also includes a non-perforated section 102. The particular area of this non-perforated section may be varied. In the illustrated embodiment, this non-perforated section 102 is approximately half of the total area of the side 82, 84 it is formed on.

Still referring to FIG. 2, each opposing side wall 26, 28 is preformed prior to its assembly to filter assembly 20. This preforming may be achieved via molding, additive manufacturing, or any other manufacturing process or processes. Each opposing end wall 26, 28 includes a cavity for the reception of a potting compound 50. Potting compound 50 secures filter media 24 and U-shaped perforated grate 40 between opposing end walls 26, 28.

More particularly, grate 40 is first installed upon filter media 24 such that body portion 80 is adjacent to downstream face 62 of filter media 24, side 82 is adjacent back face 66 of filter media 24, and side 84 is adjacent front face 64. The terms "front," "back," and "side," are used herein for purposes of orientation only. This installation may include, for non-limiting example, securing grate to filter media 24 using an adhesive or other compound, heat welding, ultrasonic welding, or may include simply positioning grate 40 on filter media 24 as described above.

Opposing end walls 26, 28 are then installed such that side face 70 of filter media 24 and side edge 86 of grate 40 are received in potting compound 50 of end wall 26, and side face 72 of filter media 24 and side edge 88 of grate 40 are received in potting compound 50 of end wall 28. Once this step is complete, gasket support 30, and optionally grate 42 may then be installed.

To assist in installation and assembly of gasket support 30, each end wall 26, 28 may also include a stop 56 to provide an abutment for gasket support 30 as it is slid over media 24 and opposing end walls 26, 28. These stops 56 axially locate gasket support 30. Further, an adhesive tape or band 46 may be employed to provide a dam between gasket support 30 and the adjacent surfaces of grate 40 and opposing end walls 26, 28 as described below.

Flat grate 42 as its name implies is generally planar. Grate 42 may incorporate tabs 92, 94 on each of opposing side edges of grate 42. These tabs 92, 94 are respectively received in slots 52, 54 on each opposing end wall 26, 28. This tab and slot configuration allows for grate 42 to be removably secured to the remainder of filter assembly 20.

Figure 4:
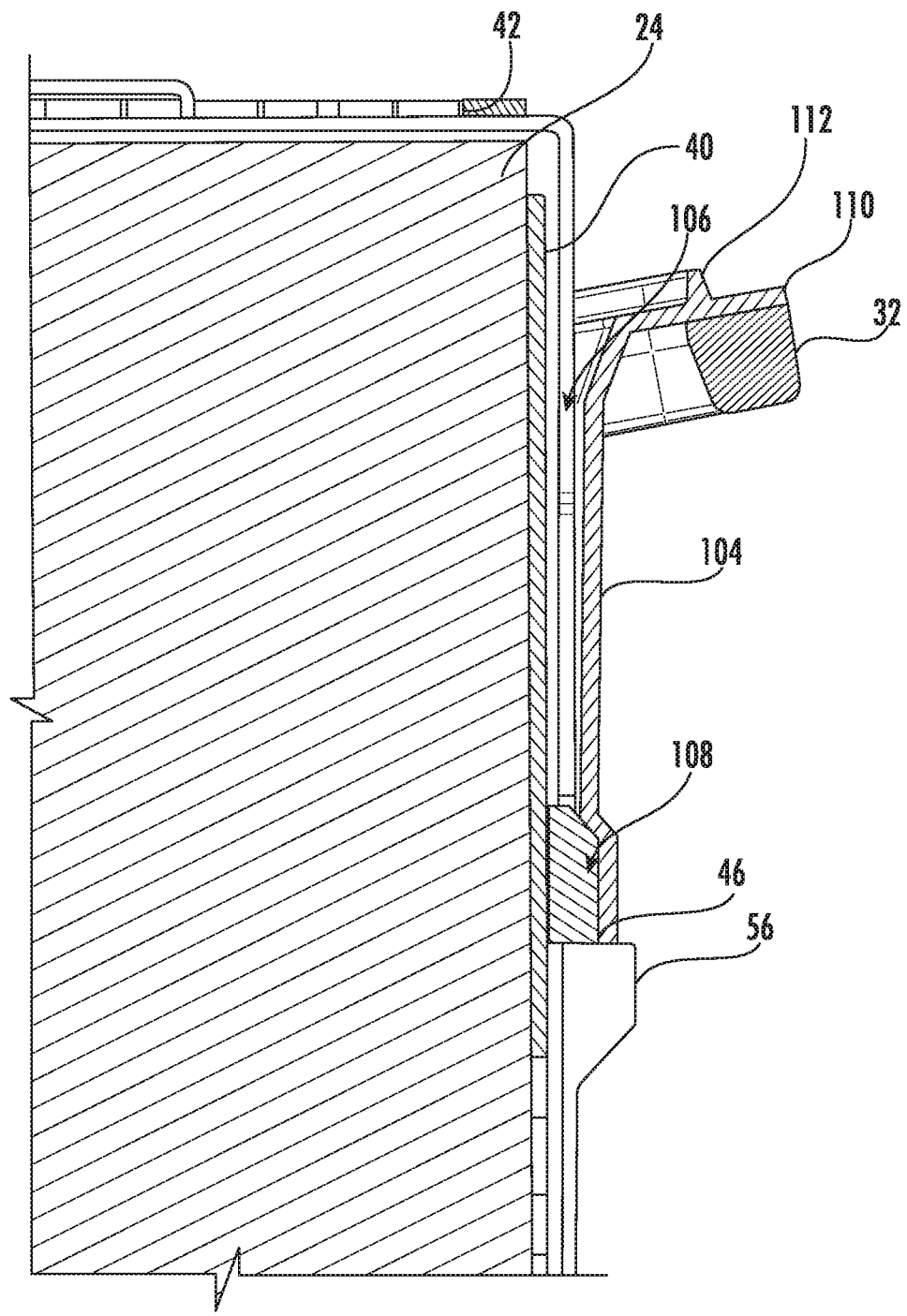
FIG. 4 is a partial cross section of the embodiment of FIG. 1, taken in the region of a seal support frame thereof.

With reference now to FIG. 4, the same illustrates a cross section taken through filter assembly 20 in a plane that is parallel to side faces 70, 72. Gasket support 30 includes a skirt 104 and a flange 110 depending outwardly from skirt 104.

As may be seen in this view, a well 106 is formed between an interior surface of skirt 104 and exterior facing surfaces of U-shaped grate 40 (particularly non perforated section 102 of each side 82, 84). Once gasket support 30 is in position, an adhesive, urethane, or any other compound suitable for fixing gasket support 30 in place is poured into well 106. This well 106 terminates at adhesive tape 46 which is contained within a terminal channel 108 formed by skirt 104. Adhesive tape 46 serves as a dam preventing outflow of the aforementioned urethane, adhesive, or any other compound prior to its full cure.

Filter assembly 20 may be scaled up or down from the dimensions illustrated in FIGS. 1-4. For non-limiting example, FIG. 5 illustrates an alternative embodiment of filter assembly 220 which is identical to that described relative to FIGS. 1-4, except that it possesses a larger size and proportion, and includes a gasket 232 which is parallel to the upstream and downstream faces of its filter media 224. Filter assembly 220 also includes opposing end walls 226, 228 which are of the same construction and function as that described above, one or more grates 240, 242, which are of the same construction and function as that described above, and a block of filter media 224 which is of the same construction and function as that described above.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter assembly, comprising:
    a frame defining a cavity and including opposing end walls, with a gasket outwardly circumscribing the frame;
    filter media disposed within the cavity of the frame, and having upstream and downstream flow faces and opposing side surfaces; and
    a U-shaped perforated grate including a body and opposing sides, located and extending between the opposing end walls and with the body adjacent one of the upstream and downstream flow faces of the media, and with each side adjacent respective side surfaces of the filter media; and
    a living hinge interconnecting each side of the U-shaped perforated grate and the body.

2. The filter assembly as in claim 1, wherein opposing edges of the U-shaped perforated grate are potted within adhesive carried by the opposing end walls.

3. The filter assembly of claim 1, wherein the frame includes a gasket support, the gasket affixed to a flange of the gasket support.

4. The filter assembly of claim 3, wherein the flange is parallel to the upstream and downstream flow faces.

5. A filter assembly, comprising:
    a frame defining a cavity and including opposing end walls, with a gasket outwardly circumscribing the frame;
    filter media disposed within the cavity of the frame, and having upstream and downstream flow faces and opposing side surfaces; and
    a U-shaped perforated grate including a body and opposing sides, located and extending between the opposing end walls and with the body adjacent one of the upstream and downstream flow faces of the media, and with each side adjacent respective side surfaces of the filter media; and
    a flat grate adjacent the other one of the upstream and downstream flow faces.

6. The filter assembly of claim 5, wherein the flat grate is connected to the opposing end walls of the frame via a tab and slot configuration.

7. The filter assembly of claim 6, wherein the tab and slot configuration includes at least one tab arranged on each of opposing side edges of the flat grate and at least one slot arranged on each of the opposing end walls associated with the at least on tab.

8. A filter assembly, comprising:
    a frame defining a cavity and including opposing end walls, with a gasket outwardly circumscribing the frame;
    filter media disposed within the cavity of the frame, and having upstream and downstream flow faces and opposing side surfaces; and
    a U-shaped perforated grate including a body and opposing sides, located and extending between the opposing end walls and with the body adjacent one of the upstream and downstream flow faces of the media, and with each side adjacent respective side surfaces of the filter media; and wherein each of the opposing sides of the U-shaped perforated grate includes a solid, non-perforated section.

9. The filter assembly of claim 8, wherein the non-perforated section is approximately 50% of the total area of the opposing side the non-perforated section is formed on.

10. A filter assembly, comprising:
a frame defining a cavity and including opposing end walls, with a gasket outwardly circumscribing the frame;
filter media disposed within the cavity of the frame, and having upstream and downstream flow faces and opposing side surfaces; and
a U-shaped perforated grate including a body and opposing sides, located and extending between the opposing end walls and with the body adjacent one of the upstream and downstream flow faces of the media, and with each side adjacent respective side surfaces of the filter media;
wherein the frame includes a gasket support, the gasket affixed to a flange of the gasket support;
wherein the flange is non-parallel to the upstream and the downstream flow faces.

11. A filter assembly, comprising:
a frame having preformed opposing end walls and defining a cavity, wherein a gasket is mounted on the frame;
filter media situated within the cavity, the filter media having opposed upstream and downstream flow faces and side surfaces extending between the upstream and downstream flow faces;
a U-shaped perforated grate arranged adjacent one of the upstream and downstream flow faces, and two of the side surfaces; and
a flat perforated grate arranged adjacent the upstream face.

12. The filter assembly of claim 11, wherein the flat perforated grate is removably attached to the opposing end walls.

13. The filter assembly of claim 11, wherein the U-shaped perforated grate is potted in place between the opposing end walls using a potting material.

14. The filter assembly of claim 13, wherein the filter media is potted in place between the opposing end walls using the potting material.

15. The filter assembly of claim 11, wherein the U-shaped perforated grate includes a body and opposing sides, wherein each opposing side is connected to the body via a living hinge.

16. A method of making a filter assembly, comprising:
providing a filter media;
providing a U-shaped perforated grate;
affixing the U-shaped perforated grate to the filter media;
preforming a pair of end walls via molding;
situating a potting compound within a cavity of each opposing end wall;
attaching each opposing end wall to opposing sides of the filter media such that the opposing sides and opposing side edges of the U-shaped grate are situated within the potting compound;
situating a gasket support with a gasket affixed thereto around the filter media, the U-shaped perforated grate, and the opposing end walls; and
a step of attaching a flat perforated grate to the opposing end walls.

17. A method of making a filter assembly, comprising:
providing a filter media;
providing a U-shaped perforated grate;
affixing the U-shaped perforated grate to the filter media;
preforming a pair of end walls via molding;
situating a potting compound within a cavity of each opposing end wall;
attaching each opposing end wall to opposing sides of the filter media such that the opposing sides and opposing side edges of the U-shaped grate are situated within the potting compound;
situating a gasket support with a gasket affixed thereto around the filter media, the U-shaped perforated grate, and the opposing end walls;
wherein the step of affixing the U-shaped perforated grate includes forming the U-shaped perforated grate as a flat component having a body and sides connected at opposing sides of the body via living hinges, and folding the sides along the living hinges to form a U-shape.

* * * * *